(No Model.)

R. L. KIMBERLY.
MACHINE FOR MAKING MATRICES.

No. 296,974. Patented Apr. 15, 1884.

(No Model.)

6 Sheets—Sheet 2.

R. L. KIMBERLY.
MACHINE FOR MAKING MATRICES.

No. 296,974.

Patented Apr. 15, 1884.

WITNESSES:

INVENTOR (No Model.)

R. L. KIMBERLY.
MACHINE FOR MAKING MATRICES.

No. 296,974. Patented Apr. 15, 1884.

WITNESSES:

INVENTOR (No Model.)
R. L. KIMBERLY.
MACHINE FOR MAKING MATRICES.
No. 296,974.   Patented Apr. 15, 1884.
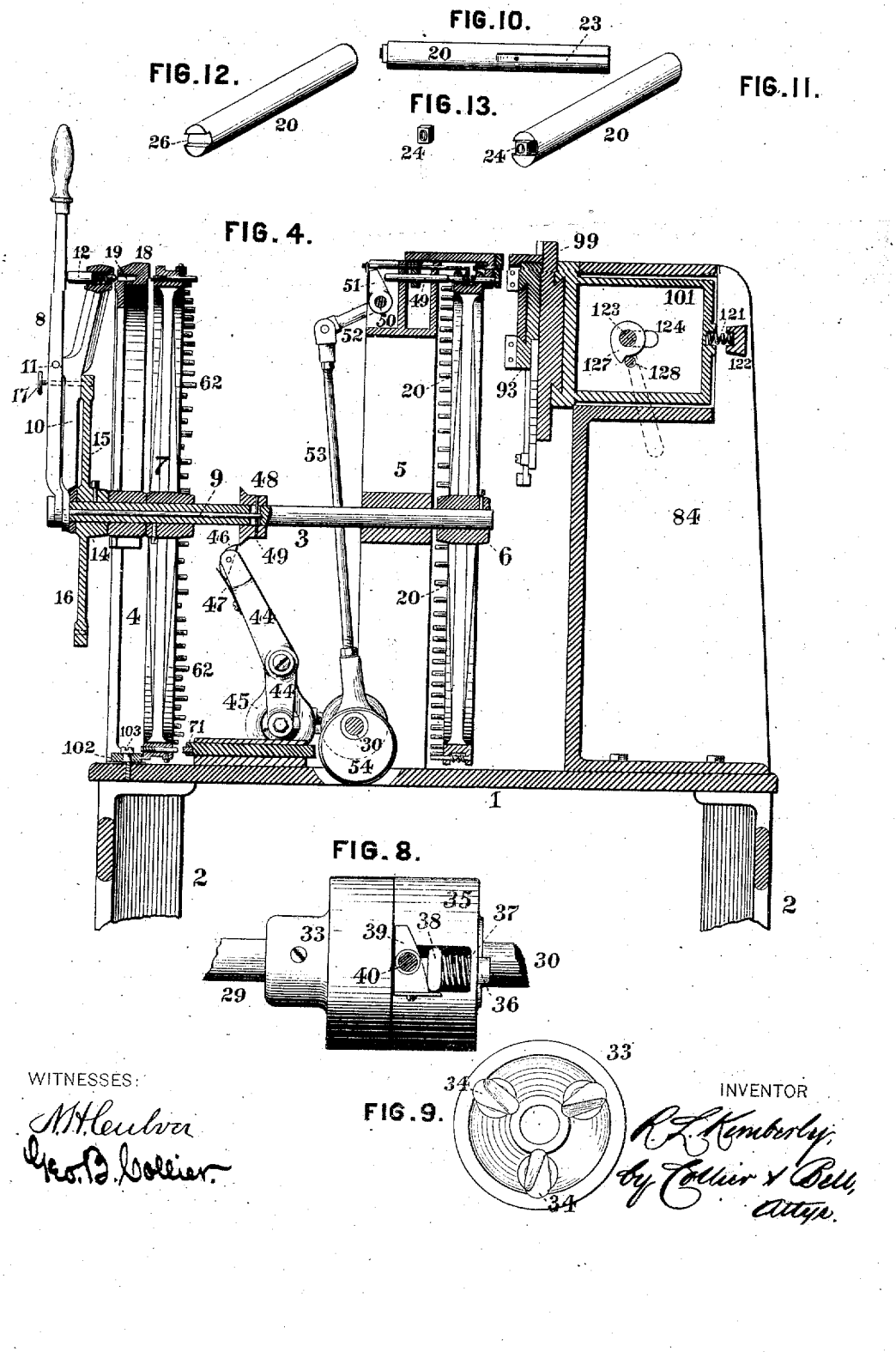

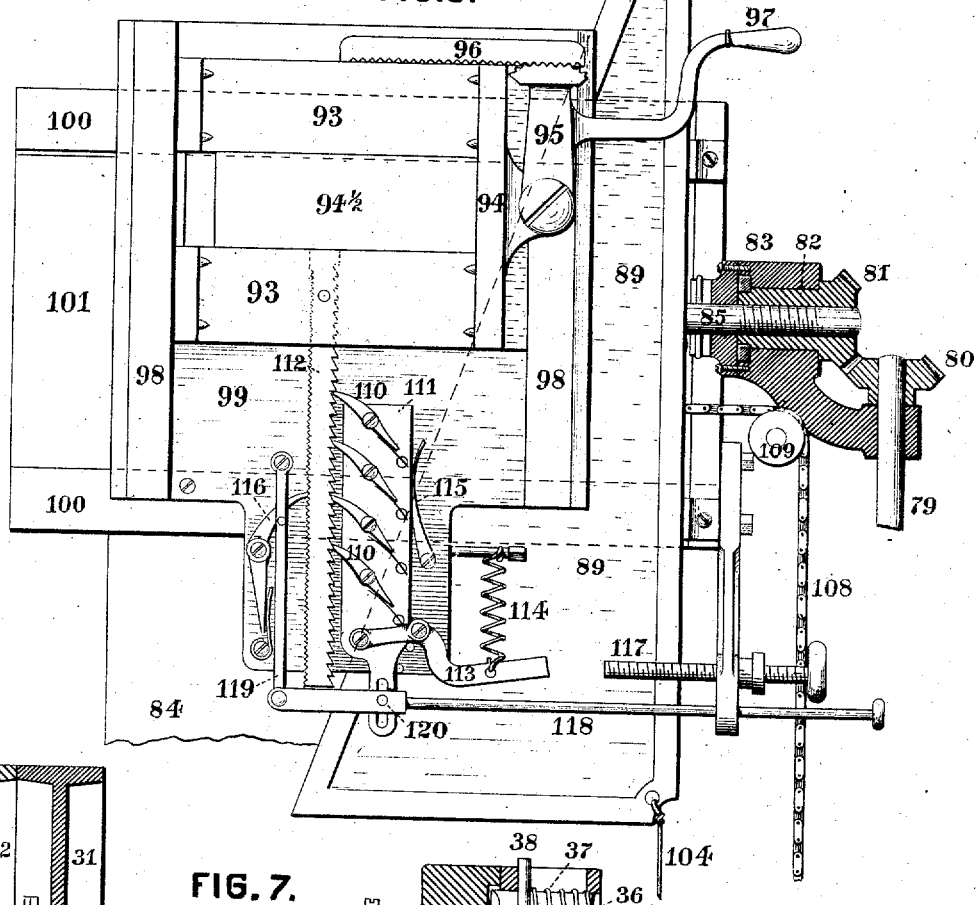

(No Model.)
R. L. KIMBERLY.
MACHINE FOR MAKING MATRICES.
No. 296,974.                    Patented Apr. 15, 1884.
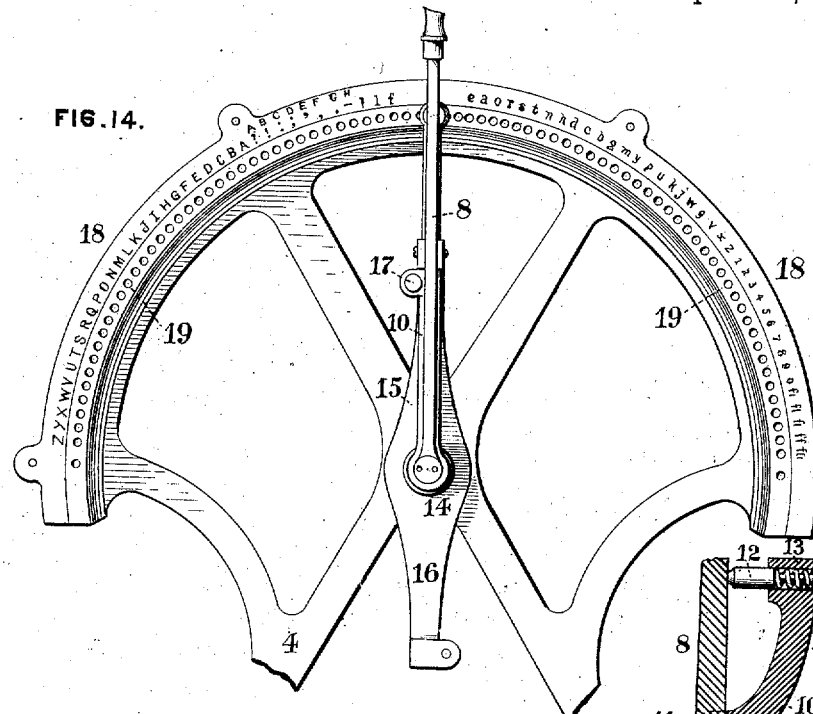
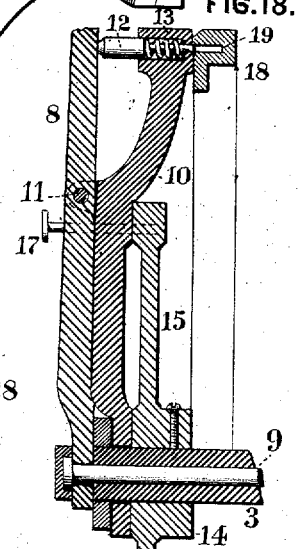
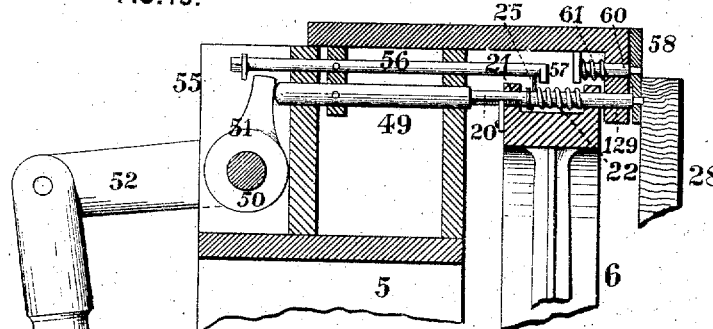
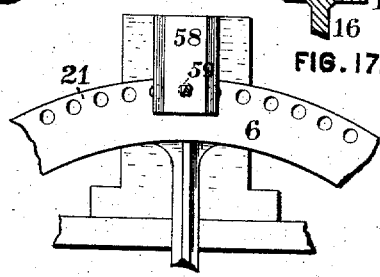
WITNESSES:
INVENTOR
R. L. Kimberly,
by Collier & Bell
Attys

UNITED STATES PATENT OFFICE.

ROBERT L. KIMBERLY, OF PHILADELPHIA, PENNSYLVANIA, ASSIGNOR TO THE AMERICAN MATRIX MACHINE COMPANY, OF NEW YORK, N. Y.

MACHINE FOR MAKING MATRICES.

SPECIFICATION forming part of Letters Patent No. 296,974, dated April 15, 1884.

Application filed August 3, 1882. (No model.)

*To all whom it may concern:*

Be it known that I, ROBERT L. KIMBERLY, of the city and county of Philadelphia, in the State of Pennsylvania, have invented certain new and useful Improvements in Machines for Making Matrices, of which improvements the following is a specification.

The object of my invention is to provide efficient and desirable mechanical means for speedily, conveniently, and economically producing matrices from which plates for letter-press printing can be formed, in order to dispense with the employment of set forms of type, and consequently to economize the time and expense involved in hand-composition, subsequent distribution of types, and the remaining operations which, as is known to those skilled in the art, are involved in the formation of stereotype-plates by the methods ordinarily heretofore practiced.

To this end my improvements consist in certain novel devices and combinations of mechanism hereinafter fully set forth.

Figure 1:
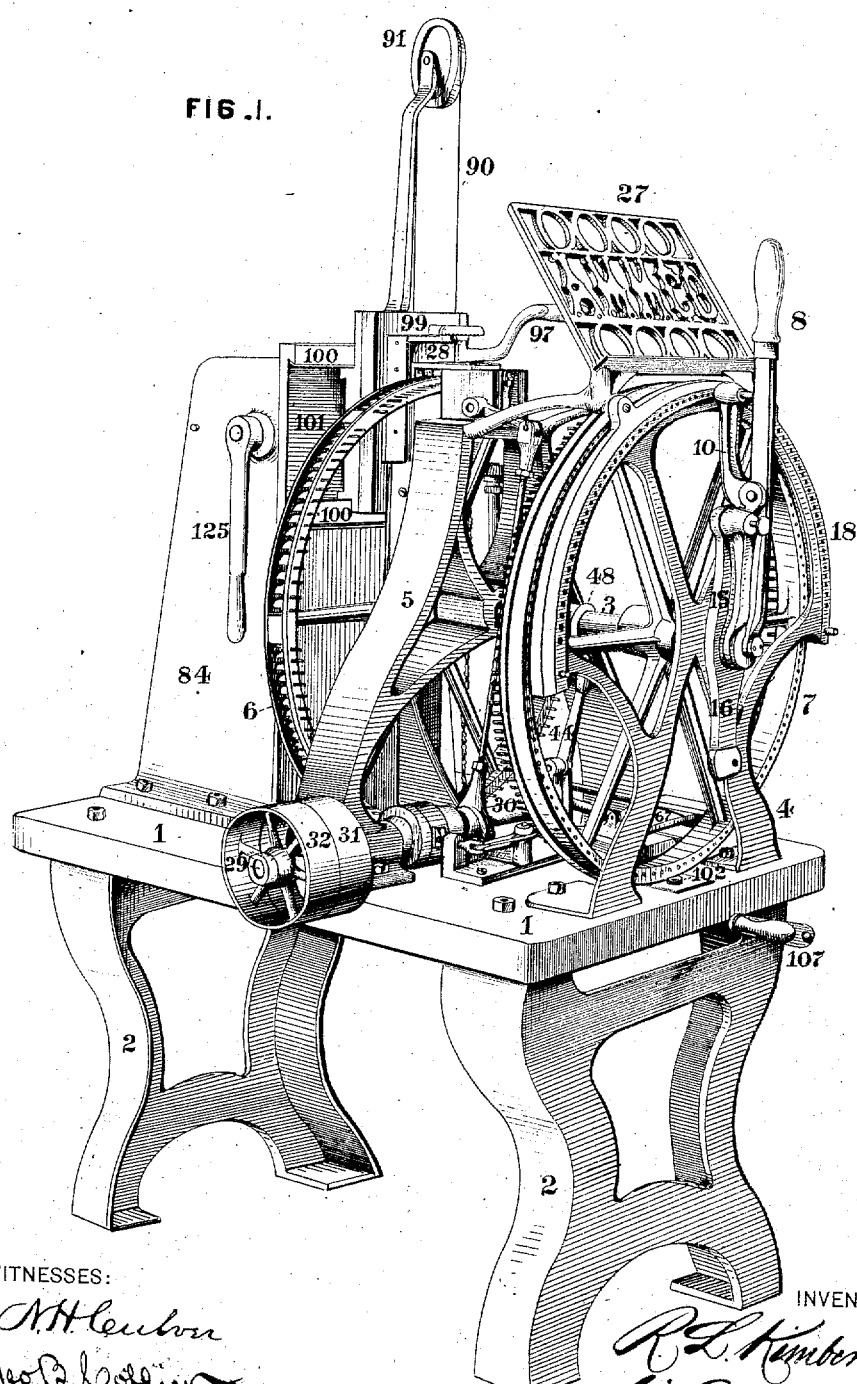
Figure 2:
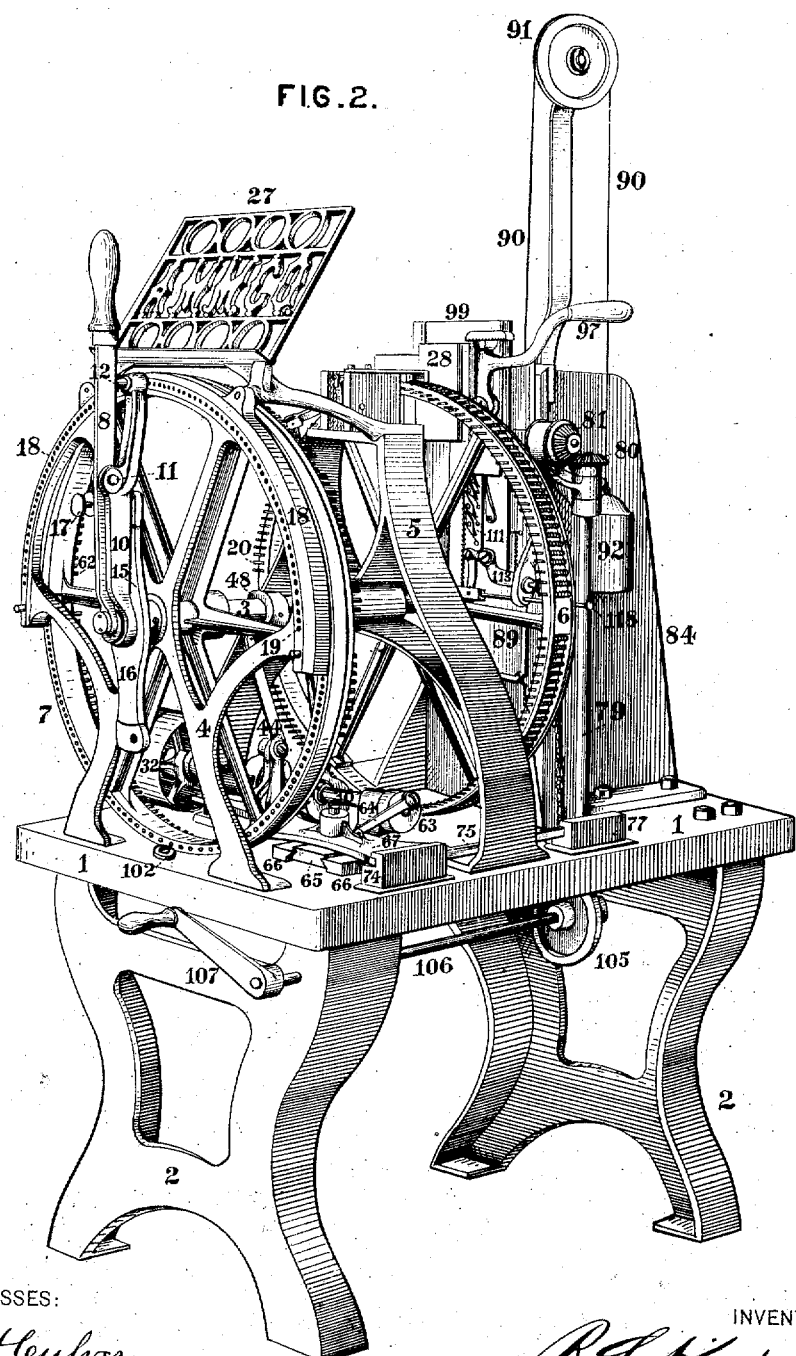
Figure 3:
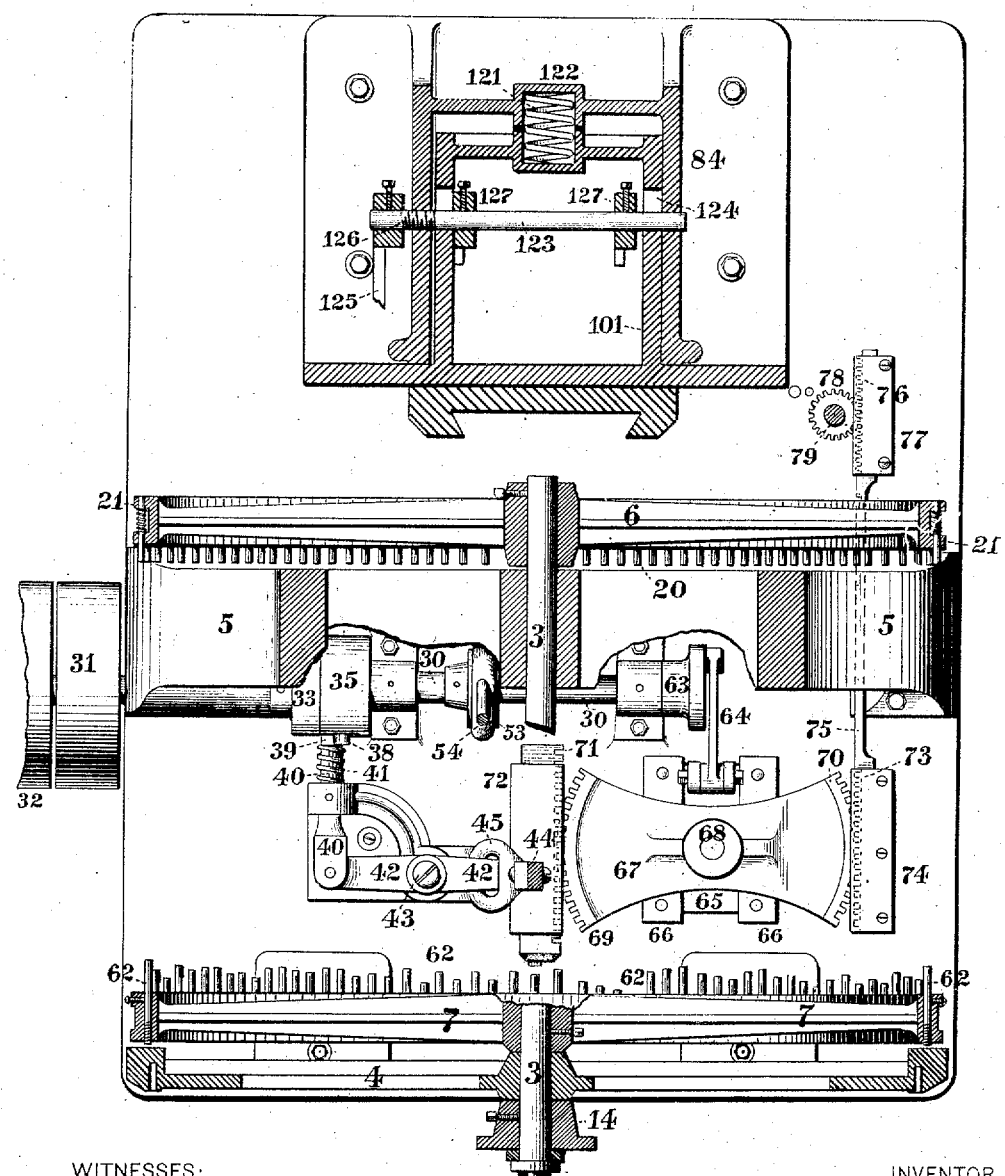

In the accompanying drawings, Figure 1 is a view in perspective of a machine for making matrices embodying my invention, as seen from the front and left sides; Fig. 2, a similar view of the same as seen from the front and right sides; Fig. 3, a horizontal section through the same, taken at the center line of the shaft of the die-carrying and feed-regulating wheels; Fig. 4, a vertical section through the same, taken at the same line as Fig. 3; Fig. 5, a front view, partly in elevation and partly in section, of the matrix-block holder and the accessories thereof relating to the feed mechanism; Fig. 6, a longitudinal central section, on an enlarged scale, through the bevel-gear of the transverse feed mechanism of the matrix-block holder; Fig. 7, a similar section through the clutch of the driving-shaft; Fig. 8, a side view in elevation of said clutch; Fig. 9, an end view in elevation of the counter-shaft collar of said clutch; Fig. 10, a side view in elevation of a type-die stock and die; Figs. 11 and 12, views in perspective of a type-die stock with and without its die, respectively; Fig. 13, a similar view of a die detached; Fig. 14, a front view in elevation of the index-segment and operating-lever; Fig. 15, a transverse section, on an enlarged scale, through the rock-shaft which reciprocates the type-dies, illustrating the mechanism for impressing and withdrawing said dies; Fig. 16, a view in elevation of a portion of the rim of the type-wheel, taken from the side next the rock-shaft; Fig. 17, a similar view taken from the side next the matrix-block; and Fig. 18, a longitudinal central section through a portion of the shaft of the die and feed wheels, illustrating the relation thereto of the operating-lever and its accessories.

The operative mechanism is mounted upon and supported by a horizontal frame or table, 1, resting upon legs 2. A shaft, 3, which may be designated as the "main shaft," is fitted so as to rotate freely in bearings formed in or attached to vertical standards 4 5 upon the table 1, said shaft having secured upon it at its inner end a type or die carrying wheel, 6, and adjacent to its outer end a feed-regulating wheel, 7, each of which will be presently described. The shaft 3 may be turned about its axis, so as to bring any desired point in the periphery of the die-wheel 6 in line with a fixed point, by means of an operating arm or lever, 8, which is connected to a rod or stem, 9, passing centrally into the main shaft 3, and extending therein for about one-half the length thereof. The opening in the hub of the arm 8 is slotted or elongated, so that the arm is susceptible not only of rotation about the axis of the rod 9, but also of a limited degree of end motion upon said rod. An arm, 10, is fitted loosely upon the shaft 3, so as to have the capacity of free rotation thereon, adjacent to the operating-arm 8, and is pivoted about midway in its length, by a pin, 11, to the arm 8.

A locking-pin, 12, is fitted in a cylindrical recess adjacent to the outer end of the arm 10, one of its ends being pressed by a spring, 13, against the adjacent side of the operating-arm 8, and the other end fitting in an opening in the bottom of the recess in which the pin rests, so as to be projected outwardly through said opening by the oscillation of the operating-arm 8 on its pivot 11.

In the operation of the machine, for a reason which will presently appear, it is not convenient to move the operating-arm 8 through an arc greater than a semicircle; and in order that either half of the peripheries of the die and feed wheels 6 and 7, which are secured upon the shaft 3, may, as desired, be moved through such segmental traverse, a hub or collar, 14, having two radially and oppositely projecting arms, 15 16, is fastened by a key or set-screw to the shaft 3, adjacent to the arm 10. A hole to which a removable pin, 17, passing through the arm 10, is fitted is formed in each of the arms 15 16, adjacent to its end, and according as the arm 10 and attached operating-arm 8 are connected by the pin 17 to one or the other of the arms 15 16, so will the halves of the die and feed wheel opposite which said arm is located be vibrated by the movements of the operating-arm 8 through the whole or any portion, as the case may be, of a semicircle located above the axis of the shaft 3.

An index-segment, 18, is formed upon or secured to the standard 4, concentric with the shaft 3, said segment having a series of holes, 19, adjacent to its periphery and parallel to the axis of the shaft 3, each suited to be engaged by the locking-pin 12 when the same is projected through the opening in the bottom of its recess by the inward movement of the upper end of the arm 8. A letter or character is marked upon the index-segment adjacent to each of the holes 19, indicative of the type or die of the type-wheel 6 to which said hole corresponds—that is to say, indicating with absolute certainty that when the locking-pin is inserted in said hole a certain known and selected die of the series located upon the type-wheel 6 will be brought into line with a plunger reciprocating in a fixed bearing, and will be maintained in proper position to be operated thereby.

A series of cylindrical die-stocks, 20, each having a type or character die, 24, upon its outer end, is fitted, each with the capacity of reciprocation in a line parallel to the axis of the shaft 3, in bearings formed in two circumferential flanges, 21, located upon the die or type carrying wheel 6, a helical spring, 22, connected to each of said die-stocks and to one of the flanges, tending to maintain said die-stock in an adjusted normal position longitudinally. A longitudinal guide-slot, 23, on each die-stock is engaged by a stop, 24½, fixed upon the die-wheel, with the result of preventing axial movement of the die-stocks in their bearings, and thereby insuring the presentation of the dies in proper position relatively to the matrix-block in which they are to be impressed. A pin, 25, inserted in each die-stock, serves to engage with a shoulder on the retracting-rod, by which the die is returned to its initial position after an impression has been made.

As heretofore constructed, the types or dies have usually been formed in one piece with the stock, and, in addition to being difficult and expensive to manufacture, it has been found in practice substantially impossible to accurately locate such dies in proper position upon their stocks; and, further, breakage or injury of a die involves the loss of the stock. To obviate these objections I prefer that the type or character dies 24 shall be formed separately from and afterward inserted in the stocks, so that they may be readily and accurately inserted and secured in position therein, and removed and replaced by others if broken or defaced, without involving the waste of the die-stocks. A method which is desirable is to form the dies 24 by electrotyping from suitable metal types, and to insert them in slots 26 in the ends of the stocks, securing them therein by solder.

The mechanism above set forth provides the requisite facilities for the consecutive selection of the dies in any desired sequence and the location of each die as selected in proper position to be impressed into a matrix-block, the manipulation of the operating-arm for such purpose being effected by the operator in correspondence with the "copy" which is to be typographically reproduced, and which is supported on a copy-holder, 27, above the index-segment, a matrix-block, 28, of wood, papier-maché, or other suitable material or composition, being provided and supported in a holder (with the capacity of transverse and vertical movements) in such position relatively to the point at which each selected die is arrested as to be adapted to receive an impression of said die. Such impression is effected by the application of power to mechanism which will now be described.

A counter-shaft, 29, is mounted in bearings on the table 1, and carries upon its outer end fast and loose pulleys 31 32, around which passes a belt for the application of power from any suitable prime mover, the shaft being either rotated continuously or remaining at rest, according as the driving-belt is located upon one or the other of the pulleys 31 32. A driving-shaft, 30, is fitted in bearings on the table 1, in line with the counter-shaft 29, and is adapted to be rotated intermittently thereby through a clutch-coupling and tripping devices, the latter being actuated by the movements of the operating-arm 8. The clutch-coupling of the counter and driving shafts consists of a collar, 33, secured upon the inner end of the counter-shaft 29, and having a series of spurs or drivers, 34, projecting from an annular recess in its face, and a collar, 35, secured upon the adjacent end of the driving-shaft 30, said collar having a pin, 36, fitted to slide in a recess parallel to the axis of the shaft. A spring, 37, bears against a shoulder on the pin 36, and tends to constantly press said pin into the annular recess on the face of the collar 33, in which position the pin 36 engages with one of the spurs 34, and by and during such engagement effects coincident rotation of the driving and counter shafts. Upon the withdrawal of the pin 36 from its engagement with either one of the spurs 34, the motion of the counter-shaft will cease to be imparted to the driving-shaft, and the latter will remain at rest until the pin is again engaged with one of the spurs or drivers.

In the operation of the machine it is necessary to impart a single revolution and no more to the driving-shaft immediately succeeding the selection and location of each die which is to be impressed. To this end a tripping-arm, 38, is formed upon the pin 36, and projects through a slot in the collar 35 for a short distance beyond the periphery thereof. A dog or pawl, 39, having one of its sides inclined or beveled at such an angle and for such distance as will suffice to move the tripping-arm 38 far enough to withdraw the pin 36 from its engagement with the spurs of the collar 33, is formed on the end of a horizontal rod or bar, 40, fitted to slide in a bearing on the table 1 at right angles to the axis of the driving-shaft 30. A spring, 41, bears against the dog 39, and tends constantly to maintain the inclined side thereof in contact with the tripping-arm 38, and to thereby hold the pin 36 out of engagement with the spurs or drivers 34 of the counter-shaft 29. It will be seen that rotation can be imparted to the driving-shaft during such period only as the dog is withdrawn from the tripping-arm, and such withdrawal is effected after each insertion of the locking-pin 12 into one of the holes 19 of the index-segment, in the following manner: The rod 40, which carries the dog 39 upon one of its ends, is connected at its opposite end to one of the arms of a double-armed lever, 42, pivoted at or near its center by a stud, 43, to the table 1, and the opposite arm of lever 42 is connected to the lower arm of a double-armed lever, 44, pivoted to a vertical standard, 45, on the table 1. A latch, 46, is pivoted to the upper arm of the lever 44 in such position as to be engaged by a collar, 48, secured by a pin, 49, to the inner end of the rod 9, which enters the shaft 3, the pin 49 passing through a slot in said shaft, so as to admit of a limited degree of longitudinal movement of the collar 48 thereon. The positions shown in Figs. 3 and 4 are those which the several parts occupy in the intervals between the impressions of the dies in the matrix-block, the dog 39 being pressed by the spring 40 against the tripping-arm 38, and the driving-shaft 30 being at rest. Upon the insertion of the locking-pin 12 in one of the holes 19 of the index-segment by the inward movement of the upper end of the operating-arm 8, the movement of the lower end of said arm draws the rod 9, and with it the collar 48, outwardly, the engagement of the collar 48 with the latch 46 of the lever 44 rocking said lever on its pivot, and, through its connection with the lever 42 and rod 40, withdrawing the dog 39 from the tripping-arm 38. The range of motion of the collar 48 is such that it passes over and beyond the latch 46, so as to be entirely clear of the lever 44, and to allow the dog 39 to be immediately returned to position to re-engage the tripping-arm 38 after one revolution of the driving-shaft 30 has been made. The spring 37 then forces the pin 36 into engagement with one of the spurs 34, and rotation is imparted to the driving-shaft. Upon the release of the collar 48 from the latch 46 the spring 41 returns the dog 39 to its former position, and at the termination of a revolution of the driving-shaft the tripping arm 38, by its impingement against the inclined side of the dog 39, withdraws the pin 36 from its engagement with the spur of the counter-shaft collar 33, and the rotation of the driving-shaft ceases. Upon the return of the collar 48 to its original position by the movement of the operating-arm to withdraw the locking-pin from the index-segment, it rides over the toe of the latch 46, which yields for the purpose and is brought back to proper position for re-engagement with the collar by a spring, 47. It will be observed, therefore, that upon the selection and location of each die, by the insertion of the pin 12 in one of the holes 19 of the index-segment, the sliding collar 48 is moved forward longitudinally, and one, and only one, rotation of the shaft 30 is caused and permitted, and by reason of such rotation, as will be presently described, one lateral or transverse feed of the matrix is caused, and in immediate sequence the selected die is impressed in the matrix-block. An impression of the selected die into the matrix-block is effected at each revolution of the driving-shaft by an impressing-plunger, 49, which is mounted in guides in the upper portion of the standard 5, adjacent to the type-wheel 6, and is pressed against the die-stock by an arm, 51, on a rock-shaft, 50, vibrated in its bearings in the standard 5 by an eccentric or crank, 54, secured upon the driving-shaft 30, the rod 53 of which eccentric is connected to an arm, 52, on the rock shaft 50. The impressing-plunger is returned to its original position in readiness for another stroke by the reverse movement of the arm 51, which bears against a shoulder or projection, 55 on a rod or bar, 56, secured to the plunger 49, and fitted to slide in guides above and parallel to the same. The return of the die-stocks 20 to their normal initial positions is likewise insured by a shoulder or projection, 57, on the opposite end of the rod 56, said shoulder engaging a pin, 25, on the die-stock. Inasmuch as there is a considerable variation in area between the several dies of the series, while a uniform impressing force is applied by the driving-shaft to all of them, there is a resultant tendency to impress the smaller dies more deeply in the matrix-block than the larger ones. To obviate such tendency and attain with certainty equal depths of impression with all the dies, the force applied to the impressing-plunger is caused to be distributed over a uniform enlarged area by the employment of a pressure-plate or shield, 58, having a slot, 59, of sufficient area to admit of the free passage of the largest die, and secured upon the end of a stem, 60, fitted to slide parallel to the impressing-plunger, in a guide upon a bracket attached to the standard 5. The pressure-plate 58 is forced outwardly so as to bear upon the matrix-block by the shoulder upon the die-stock below the die, which projects through the plate for a distance equal to the desired depth of impression. The pressure applied by the driving-shaft being sufficient to impress the largest die to the required depth, and to carry the pressure-plate firmly against the matrix-block, the interposition of the pressure-plate prevents any deeper impression being made by the smaller dies, as the surplus pressure is transferred to the enlarged surface of the pressure-plate, which bears against without indenting the matrix-block. The pressure-plate is returned to its original position after each impression by a spring, 61. The true rectilineal movement of the die-stocks relatively to their desired location of impression in the matrix-block is assured by causing them to pass through a guide, 129, in the bracket which supports the stem of the pressure-plate, to which guide they are accurately fitted.

The formation of a matrix involves, as will be obvious to those skilled in the art, the location of a properly-arranged series of characters in lines of a determined length or "measure," and therefore means are requisite, first, for imparting a transverse movement to the matrix-block after each impression, to place it in proper position to receive the next succeeding impression, and, second, for returning the block to its initial position after the completion of a line, and moving it vertically for such distance as will provide the space desired to be allowed between the completed line and the next succeeding one. The degree of each of said movements, moreover, is of necessity variable, the variation of the transverse movement being due, primarily, to the differences in width of the several dies employed, and, secondarily, to the varying spaces between the characters demanded by the requirements of the copy. Similarly, greater or less spaces between the several lines are from time to time required, and must be provided for. The ends above set forth are attained by the employment of feed mechanism, the construction and operation of which will now be described.

The feed-regulating wheel 7, which is secured upon the shaft 3, carries a circumferential series of stops or projections, 62, each secured in its rim parallel to its axis by a set-screw, so as to be readily insertible, removable, and adjustable relatively to the inner side of the wheel 7. The extent of the projection of each of the several stops 62 beyond the inner side of the wheel is fixed in conformity with the degree of transverse traverse of the matrix-block, which said stop is designed to determine, and which it, through intermediate mechanism hereinafter described, causes to be imparted to the matrix-block. Each of the stops 62 corresponds with one of the dies of the type-wheel 6—that is to say, each of the stops is so located upon the feed-regulating wheel 7 relatively to a certain die upon the die-wheel 6 that when said die has been brought into position to be impressed into the matrix-block, as before set forth, said stop will stand in such position relatively to a fixed point as will enable it (the stop) to act as the primary means of regulating the transverse feed of the matrix-block, or, in other words, of causing the matrix-block to be fed or moved transversely just such a distance as may be required by the width of said die to admit of the proper presentation of the block to receive the impression of another die. Such regulated transverse feed of the matrix-block is imparted automatically thereto by the driving-shaft 30, upon which is secured a crank, 63, coupled by a connecting-rod, 64, to a block or slide, 65, which is fitted to reciprocate in guides 66 upon the table 1. A double-armed lever, 67, pivoted by a pin, 68, to the slide 65, carries upon its ends toothed segments 69 70, the one, 69, engaging a rack, 71, adapted to move in a guide, 72, on the table, and the other, 70, engaging a rack, 73, similarly fitted in a guide, 74. The rack 71 is so located relatively to the feed-regulating wheel 7 that its adjacent end shall, at one extremity of its traverse, abut either against that one of the stops 62 of the feed-regulating wheel 7 which corresponds with the die which has been coincidently selected to be impressed in the matrix-block, or against a stop on the wheel 7 which corresponds with a blank space of known length. It will be seen that by reason of the fact that the lever 67 is mounted upon a sliding center variations in the traverse of the rack 71, with which the toothed segment 69 of one of its arms meshes, will effect corresponding variations in the traverse of the rack 73, which is engaged by the toothed segment 70 of its opposite arms, and that consequently the rack 73 will impart a greater or less degree of movement, as the case may be, to mechanism connected with it in correspondence with the length of the stops against which the rack 71 abuts.

A friction-roller, 102, is mounted upon a stud, 103, so as to bear against the outer side of the feed-regulating wheel 7, and thereby to act as an abutment to resist the strokes of the rack 71 upon the stops 62 and prevent the displacement of the wheel 7 by the action thereof. The stud 103 is fitted in the table 1 eccentrically to the roller 102, so as to admit of wear being taken up, as required. The rack 73 is connected by a rod or bar, 75, with a rack, 76, fitting in a guide, 77, and engaging a pinion, 78, upon a vertical shaft, 79, which carries a bevel-pinion, 80, meshing with a similar pinion, 81, upon a short horizontal shaft, 82, fitting in a bracket, 83, secured to a vertical frame or standard, 84, fixed upon the table 1 at the rear of the machine. A plunger, 85, having an external screw-thread, 86, is fitted concentrically in the shaft 82 of the pinion 81, its thread 86 engaging a corresponding female thread in said shaft. A stop, 87, upon the plunger 85 is fitted to move freely in a slot formed in a cap, 88, secured to the bracket 83, and, by preventing the rotation of the plunger, causes the same to be reciprocated in one or the other direction, according to the direction of rotation of the pinion 81, the extent of such reciprocating movement being greater or less in accordance with the number of revolutions imparted to said pinion by the rack 76 and pinion 78. The plunger 85 bears at its end farthest from the pinion 81 against the straight side of a key, 89, which is connected to one end of a cord, 90, passing around a pulley, 91, supported on the standard 84, said cord having a weight, 92, sufficient to elevate the key attached to its opposite end. The key 89 is, by each movement of the plunger 85, moved an equal distance in the direction of said movement, and upon the return of the plunger 85 to its initial position, by the rotation of the pinion 81 in the opposite direction, the weight 92 elevates the key so as to maintain its straight side in contact with the end of the plunger in readiness to be again moved to the left by the next succeeding movement of the plunger, in that direction. The traverse of the key 89, just described, the degree of which, at each movement of the plunger, is in correspondence with the greater or less traverse of the toothed segment 70 and racks 73 and 76, imparts the requisite transverse feed to the matrix-block 28, which is supported in a matrix-block holder, 93, in which it is secured by an adjustable clamping-jaw, 94, which is connected to or formed in one piece with a slide, 94½, fitted to move in a guide or slot in the matrix-block holder, and is pivoted to an arm, 95, having a series of teeth on its free end engaging a similar series on a bar, 96, secured to the matrix-block 93, the arm 95 being vibrated to move the jaw 94 in either direction by a hand-lever, 97. The matrix-block holder 93 is fitted to slide vertically between guides 98 on a carrier, 99, which is in turn adapted to be moved horizontally in guides 100, formed upon a sliding head or frame, 101, which fits with the capacity of movement toward and from the die-wheel 6 in the standard 84. The side of the carrier 99, adjacent to the key 89, is slotted on a bevel or incline in correspondence with the inclined face of said key, so that each transverse movement of the key imparts a corresponding movement to the carrier, the elevation of the key by the weight 92 maintaining it constantly in position to be moved to the left by the plunger and to impart said movement to the carrier 99. Upon the completion of a line the key 89 is lowered by a cord, 104, connected to a pulley, 105, on a horizontal retracting-shaft, 106, fitted in bearings below the table 1, and rotated by the operator by a crank, 107, and, coincidently with its withdrawal, the carrier 99 is returned to its initial position by a chain, 108, passing around an idler, 109, on the standard 84, and connected to a pulley on the retracting-shaft 106, which pulley should be of smaller diameter than that to which the key is connected, in order that the downward movement of the key should be slightly in advance of the movement of the carrier 99 to the right. A regulated vertical movement such as may be required to afford the desired space between two adjacent lines of impressions is imparted to the matrix-block holder, slightly before the completion of its return to its initial lateral position, by a series of pawls, 110, pivoted to a block, 111, and engaging ratchet-teeth upon a vertical bar, 112, secured to the matrix-block holder 93. The pawl-block, 111, is connected near its lower end to one arm of a double-armed lever, 113, pivoted to the carrier 99, which supports the matrix-block holder 93, the opposite end of said lever being connected by a spring, 114, to a stud on the carrier. A spring, 115, maintains the block 111 in such position as to insure the engagement of the pawls 110 with the ratchet-teeth of the bar 112. A retaining and releasing pawl, 116, pivoted to the carrier 99, engages a series of ratchet-teeth on the side of the bar 112 opposite that on which the ratchet-teeth engaged by the lifting-pawls 110 are formed, said pawl 116 serving to maintain the matrix-block holder in position when the lifting-pawls are out of contact with the ratchet-teeth, and also admitting of the matrix-block holder being brought into its lowest vertical position upon the completion of a matrix-block, in readiness for a new operation. By the employment of a series of pawls the necessity of using ratchet-teeth of undue fineness is obviated. Vertical movement is imparted to the matrix-block holder by the contact of the end of the lever 113 with an adjustable stop, 117, upon the head 101, said lever being thereby rocked upon its pivot, so as to elevate the pawl-block 111 and lifting-pawls 110. The lift of the pawls 110 may be varied, as required, by the adjustment of the stop 117, which is threaded or otherwise adjustably fixed in its bearing for the purpose, a greater or less projection of the stop 117 effecting a correspondingly greater or less traverse of the pawls and elevation of the matrix-block holder. In order to disengage the retaining and releasing pawl 116 and the lifting-pawls 110 from the ratchet-teeth of the bar 112, so as to admit of the lowering of the matrix-block holder, a releasing-rod, 118, is connected to a link, 119, which is pivoted to the carrier 99, and is provided with a projecting pin, which rests beneath and against the pawl 116. A pin, 120, on the rod engages a vertical slot in the lower end of the pawl-block 111. It will be seen that by the movement of the rod 118 to the left all the pawls will be disengaged, leaving the matrix-block holder free to be lowered by the operator.

The purpose of the sliding head or frame 101, before referred to, within which the carrier 99 of the matrix-block holder is fitted to move, is to adjust and maintain the matrix-block in normal relation to the type-carrying wheel and dies, so that, irrespective of the varying thicknesses of the different matrix-blocks operated upon, the faces thereof shall be presented at such distance from the dies as will be proper to enable the latter to be impressed into the blocks for the requisite depth. To this end the head 101 is fitted so as to be movable freely in a horizontal plane in the standard 84 toward and from the die-wheel 6, and is pressed outwardly toward the same by a spring, 121, bearing at one end against an abutment, 122, on the standard 84 and at the other against the rear of the head 101. The latter is locked in the adjusted position into which it is moved by the spring 121 by a locking-shaft, 123, passing freely through horizontal slots 124 in the head 101, and susceptible of being rocked by a hand-lever, 125. The locking-shaft 123 passes freely at one end through the web of the standard 84, and adjacent to its opposite end has a screw-thread, 126, formed upon it, said thread engaging a corresponding female thread in the adjacent web of the standard 84. Arms 127 upon the shaft 123 are by the rocking of said shaft caused to bear against a transverse rod or bar, 128, on the head 101, so as to move the head backward to admit of the insertion of a matrix-block in the holder. On the release of the shaft 123 the spring 121 forces the head forward into the proper position required by the thickness of the block, and the head is locked and maintained in said position during the formation of the matrix by the engagement of the thread 126 of the locking-shaft with the female thread of the standard 84, the induced end motion of the shaft 123 causing the hub of one of the arms 127 to clamp the head 101 against the standard.

From the foregoing description it will appear that the formation of a matrix under my invention involves the performance of the following several operations, to wit: first, the selection of a desired type or character die from a series and its proper location relatively to a matrix-block into which it is to be impressed, such selection and location being effected, as set forth, by the operator by means of the operating-arm, double-armed lever of the main shaft, and index-segment; second, the impression of such selected and located die into the matrix-block, which is performed by an impressing-plunger actuated by the driving-power; and, third, the feeding or consecutive movement of the matrix-block into position proper to receive the successive impressions of the several dies required to form a reproduction of the copy, such operation being performed, so far as each line of impressions and the distance between any two lines are concerned, automatically, and, so far as relates to the return of the matrix-block to position proper for the commencement of a new line, being effected by the operator.

The machine described and shown embodies the necessary mechanism for the performance of each of the operations aforesaid; and I have further devised accessories thereto, by which the copy may be so prepared and the justification of the several lines so regulated that the general result will be greatly facilitated and perfected. Such devices, however, are not essentials of the machine, and do not constitute, *per se*, part of my present invention, for which reason they are not herein specifically described.

I claim as my invention and desire to secure by Letters Patent—

1. The combination, substantially as set forth, of a type or die carrying wheel, a series of die-stocks, each having a type or character die upon one of its ends, and fitted to reciprocate in a bearing in said wheel, a stationary index or guide, and mechanism for arresting and securing the type or die wheel in such position that any desired die of the series shall be brought into a position which is indicated and determined by the index.

2. The combination, substantially as set forth, of a type or die carrying wheel secured upon a shaft, a series of type or character dies fitted to reciprocate in said wheel, an operating arm or lever provided with a pin or projection, and coupled by a detachable connection to the shaft of said wheel, and a stationary index or guide segment having a series of openings or recesses, each adapted to receive said pin, these members being combined for joint operation to enable any die of the series to be selected, brought into determined position, and the further movement of the die-wheel arrested.

3. The combination, substantially as set forth, of a type or die carrying wheel secured upon a shaft, an operating arm or lever coupled detachably to said shaft, a pair of arms secured to and projecting in opposite directions from said shaft, and a pin by which the operating-lever may be coupled to either of said arms, these members being combined for joint operation to enable either half of the type-wheel to be rocked, as desired, by the movements of the operating-lever within a semicircle on a determined side of its center.

4. The combination, substantially as set forth, of a type or die carrying wheel secured upon a shaft, a collar adapted to be reciprocated on said shaft by the operating-arm thereof, a counter-shaft for the reception of driving-power from a prime mover, a driving-shaft connected by a clutch-coupling with said counter-shaft, so as to be capable of being rocked intermittently thereby, tripping mechanism for engaging and disengaging the counter and driving shafts, and a rock-shaft connected with said tripping mechanism and rocked by the movement of the collar on the type or die wheel shaft, these members being combined for joint operation to admit of a single revolution being imparted to the driving-shaft by a movement of the operating-arm and collar.

5. The yielding pressure plate or shield, substantially as and for the purpose set forth.

6. The combination, substantially as set forth, of a die-stock having a type or character die upon one of its ends, and a pressure plate or shield interposed between a shoulder on the die-stock and a matrix block or bed, for the purpose of distributing the impressing force over a uniform enlarged area.

7. The combination, substantially as set forth, of a die-stock having a type or character die upon one of its ends, a reciprocating plunger acting to effect impressions of said die in a matrix-block, and a movable pressure plate or shield interposed between a shoulder on the die-stock and the face of the die.

8. The combination, substantially as set forth, of a feed-regulating wheel having a series of stops or projections of different lengths located circumferentially upon it, an operating arm or lever for the purpose of rotating said wheel either partially or entirely, as desired, and a sliding abutment, the travel of which is regulated by the length of the projection selected by the movement of the operating-arm and feed-wheel.

9. The combination, substantially as set forth, of a feed-regulating wheel and a type or die wheel, both secured to a shaft which is susceptible of either entire or partial rotation, an operating arm or lever connected to said shaft, and a stationary index or guide segment, with which said operating-arm is adapted to be engaged at different points.

10. The combination, substantially as set forth, of a feed-regulating wheel having a series of stops or projections of varying lengths secured thereto, a reciprocating block adapted to abut against any one of said series of stops, and feed mechanism connected with said reciprocating block, these members being combined for joint operation, to enable varying degrees of traverse dependent on the lengths of the several stops to be imparted by the feed mechanism.

11. The combination, substantially as set forth, of a driving-shaft, a block reciprocated thereby, and a double-armed vibrating lever pivoted upon said block and adapted to receive and impart varying degrees of traverse to feed mechanism.

12. The combination, substantially as set forth, of a series of stops of varying lengths, a double-armed lever pivoted upon a reciprocating block or slide, and having a toothed segment upon each of its ends, a rack formed upon a block adapted to abut against any one of said series of stops, and engaging one of the toothed segments of the double-armed lever, and a rack engaging the other segment thereof and imparting rotation to a feed-shaft.

13. The combination, substantially as set forth, of a feed-regulating wheel, having a circumferential series of stops or projections, a reciprocating block adapted to abut against said stops, and a bearing or abutment to prevent displacement of the feed-regulating wheel by the impingement of said block against said stops.

14. The combination, substantially as set forth, of a matrix-block holder having a series of teeth upon one of its sides, an adjustable clamping-jaw having a slide working in said holder, and an arm pivoted to said jaw, and having a series of teeth adapted to engage the teeth of the matrix-block holder.

15. The combination, substantially as set forth, of a carrier fitting in guides on a head or frame, and having an inclined side, a matrix-block holder supported and movable within said carrier at right angles to the guides thereof, a key having one of its sides inclined correspondingly with the inclined side of the carrier, and suspended so as to be elevated by a weight or spring, and a reciprocating plunger acting upon the straight side of the key, these members being combined for joint operation to effect the advancement, intermittently, of the carrier throughout the length of its guides by the successive alternate movements of the plunger in one direction.

16. The combination, substantially as set forth, of a matrix-block holder supported in a laterally-moving carrier, a vertically and laterally moving key acting to transmit successive movements of a plunger to said carrier, and a retracting-shaft having pulleys secured by flexible connections to the carrier and to the key, respectively.

17. The combination, substantially as set forth, of a carrier, a matrix-block holder fitted to move vertically therein, pawl-and-ratchet mechanism for imparting intermittent vertical movement to the holder within the carrier, an independent retaining-pawl and ratchet for maintaining the holder in position during the intervals between its movements in the carrier, and a releasing device for throwing the several pawls out of contact with their ratchets, to admit of the return of the matrix-block holder to its initial position at the termination of its traverse in the carrier.

18. The combination, substantially as set forth, of a matrix-block holder, a sliding head carrying said holder, a stationary frame or abutment, and a spring interposed between said abutment and the sliding head, for regulating the position of the matrix-block relatively to the face of an impressing-die.

19. The combination, substantially as set forth, of a stationary frame or standard, a head or frame fitted to slide in guides on said standard, a carrier supporting a matrix-block holder and adapted to traverse in guides on one end of said head or frame, a spring bearing against the opposite end of said head and against an abutment on the stationary frame or standard, and a locking-shaft and screw to secure said head in the position into which it may be moved by the tension of the spring.

R. L. KIMBERLY.

Witnesses:
CHAS. B. COLLIER,
GEO. B. COLLIER.